(12) United States Patent
Van Gent

(10) Patent No.: US 6,666,639 B2
(45) Date of Patent: Dec. 23, 2003

(54) THREADED FASTENING DEVICE

(76) Inventor: Jason Peter Van Gent, 110 Akatarawa Road, Birchville, Upper Hutt (NZ)

( * ) Notice: Subject to any disclaimer, the term of this patent is extended or adjusted under 35 U.S.C. 154(b) by 0 days.

(21) Appl. No.: 10/117,906

(22) Filed: Apr. 8, 2002

(65) Prior Publication Data

US 2002/0164227 A1 Nov. 7, 2002

(30) Foreign Application Priority Data

Apr. 9, 2001 (NZ) .................................................. 511009

(51) Int. Cl.$^7$ ............................. F16B 37/08; F16B 39/36
(52) U.S. Cl. ..................... 411/432; 411/267; 411/433
(58) Field of Search ............................... 411/3–5, 267, 411/270, 432, 433

(56) References Cited

U.S. PATENT DOCUMENTS

| | | | |
|---|---|---|---|
| 530,963 A | * | 12/1894 | Rhodes .................... 411/270 |
| 730,599 A | * | 6/1903 | Bartley .................... 411/270 |
| 764,662 A | * | 7/1904 | Gibbs ....................... 411/270 |
| 2,490,728 A | | 12/1949 | Cox |
| 2,664,023 A | * | 12/1953 | Mugford .................. 411/433 |
| 3,058,386 A | * | 10/1962 | Morrow ................... 411/267 X |
| 4,132,146 A | | 1/1979 | Uhlig |
| 4,226,164 A | | 10/1980 | Carter |
| D262,940 S | | 2/1982 | Spinner |
| 4,556,352 A | | 12/1985 | Resnicow |
| 4,923,349 A | | 5/1990 | Logsdon |
| 5,039,266 A | | 8/1991 | Nagayoshi et al. |
| 5,139,381 A | * | 8/1992 | Lubreski et al. ........ 411/267 X |
| 5,788,443 A | | 8/1998 | Cabahug |
| 5,921,734 A | | 7/1999 | Kataoka |
| 5,927,917 A | * | 7/1999 | Gibbons ..................... 411/4 |

* cited by examiner

Primary Examiner—Neill Wilson
(74) Attorney, Agent, or Firm—Myers Bigel Sibley & Sajovec

(57) ABSTRACT

The present invention provides a threaded fastening device assembly including an outer member having an upwardly extending and circumferentially disposed body with a non-threaded inner and outer surface, at least two inner members, each inner member having an internal surface which is threaded and an outer surface that is complimentary in shape to said inner surface of said outer member, wherein, said outer member is adapted to be slideably engageable with said inner members and wherein in use, said fastening assembly is rotatable and engageable with a complimentary threaded fastening shaft.

10 Claims, 4 Drawing Sheets

THREADED FASTENING DEVICE

RELATED APPLICATION

This application claims the benefit of New Zealand Patent Application No. 511009, filed Apr. 9, 2001, the disclosure of which is hereby incorporated herein by reference.

The present invention relates generally to a threaded fastening device, in particular the invention relates an assembly of parts, which co-operate to provide a threaded fastening device.

BACKGROUND OF THE INVENTION

Conventional fastening devices such as integrally formed threaded nuts are well known and have been used for many years.

These conventional nuts are applied to a threaded member such as a bolt and together the nut and bolt co-operate to fasten or secure an object between the bearing face of the nut and the bearing face of the bolt.

One of the difficulties with these conventional nuts is that they can at times be very difficult to separate from a bolt or threaded member. These difficulties typically arise for a number of reasons. These reasons include the accumulation of grit and grime in the thread, the rusting of the threaded member or nut to some extent, the burring or rounding of the nut or bolt, or damage to the thread or nut, such as cross threading.

All these situations mean that at times it can be very difficult to unwind a nut from a bolt or threaded member.

Other difficulties are often experienced through the amount of time that is required to fasten or unfasten a nut from a bolt. These difficulties arise if the bolt or threaded member is particularly long, it can take a considerable period of time to unwind the nut from the thread. Also, in some situations such as temporary fencing and scaffolding, the removal of nuts from bolts can be a very time consuming exercise. Another known difficulty of conventional nuts and threaded members is that sometimes the nuts are in places making it difficult to reach with hands or tools.

This often makes it a time consuming job to tighten or unwind a nut where rotation of the nut itself can only be done in small increments because of a space limit in which to turn a tool such as a crescent or the like.

It is an object of the present invention to overcome some of these known difficulties and to provide a nut which can be easily removed from a threaded fastening member, or which at least provide the public with a useful choice.

SUMMARY OF THE INVENTION

In the first aspect the present invention provides a threaded fastening device assembly including, an outer member having an upwardly extending and circumferentially disposed body with a non-threaded inner and outer surface, at least two inner members, each inner member having an internal surface which is threaded and an outer surface that is complimentary in shape to said inner surface of said outer member, wherein, said outer member is adapted to be slideably engageable with said inner members and wherein in use, said fastening assembly is rotatable and engageable with a complimentary threaded fastening shaft.

Preferably, each inner member further includes a locking means which is adapted to engage with a complimentary locking means on said outer member.

Preferably the locking means on the inner member is a rib which engages with a corresponding groove on said outer member.

Preferably the body of said outer member is adapted and dimensioned in shape to include a recess extending circumferentially around the base of said body, which is adapted to receive a complimentary flange extending from each of said inner members.

Preferably the external surface of the outer member is shaped to suit the application to which the fastening assembly is to be put. One such preferred shape is a hexagonally shaped outer member.

In a second aspect of the present invention there is provided a kit of parts for a threaded fastening device assembly as defined above, wherein said kit includes an outer member and at least two inner members as defined above.

Preferably, the kit includes a retaining member which retains each of the inner members in fixed location to each other.

Preferably, the retaining member retains said inner members in a spaced apart relationship, such that in use, said retaining member and inner members can be slid down the length of a threaded shaft and positioned to receive and engage with said outer member. A sacrificial wire retaining the outer member and the inner members in a spaced apart relationship would be one such preferred embodiment.

In a further aspect of the invention there is provided an outer member adapted to receive two or more inner member portions as defined above.

In a further aspect of the present invention, there is provided an inner member portion, wherein two or more inner member portions together are adapted to be slideably engageable with an outer member as defined above.

Further aspects of the invention will become apparent from the following description and figures given by way of example only, wherein:

DETAILED DESCRIPTION OF THE INVENTION

Figure 1:
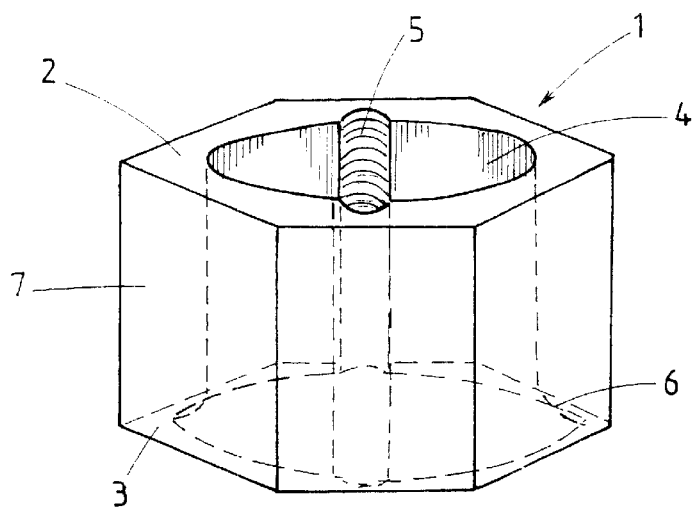
FIG. 1 illustrates a perspective view of an outer member of a threaded fastening device.

FIG. 1 illustrates an outer member 1 of a preferred embodiment of the invention. The outer member 1 has a top face 2 and a bottom bearing face 3. The inner surface 4 of the outer member 1 is circumferentially and upwardly extending. The inner surface preferably has one or more locking members 5 (illustrated as a groove 6) which extends from the top face to the bottom bearing face of the outer member. Preferably the internal surface proximate the bearing face is recessed or flared (illustrated as 6) to receive a flange. The preferred shape of the internal surface of the outer member is best illustrated with the side view shown in FIG. 2. Preferably the external surface 7 of the outer member is hexagonally shaped. The purpose of the shape is to enable engagement of the outer member with a conventional crescent or conventional complimentary shaped socket tools.

Figure 2:
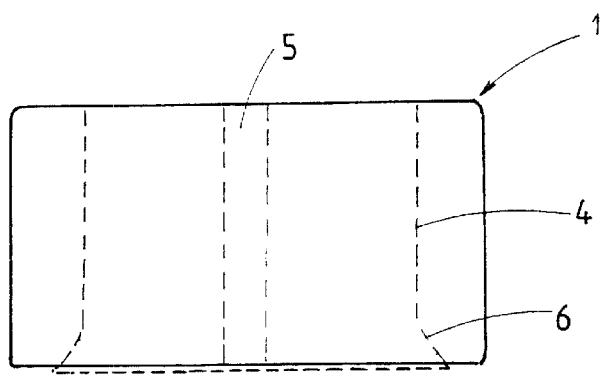
FIG. 2 shows a side view of the outer member illustrated in FIG. 1.
Figure 3:
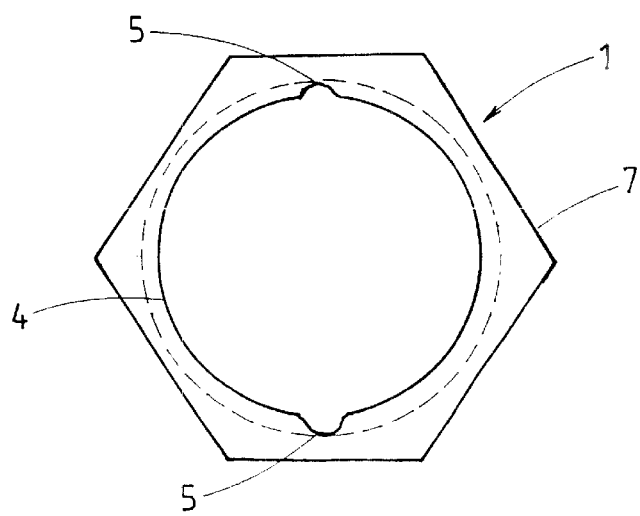
FIG. 3 shows a plan view of the outer member illustrated in FIGS. 1 and 2.
Figure 4:
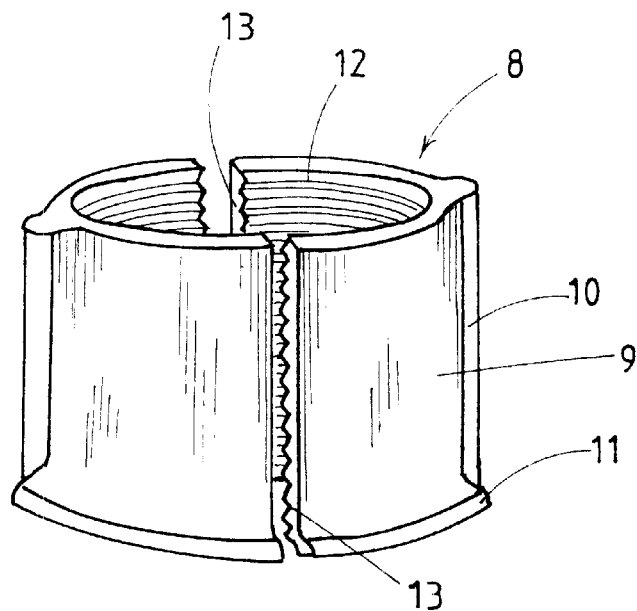
FIG. 4 shows a perspective view of two inner member portions.

The outer member as illustrated in FIGS. 1 to 3 is adapted to slideably engage with at least two inner members. The inner members 8 of the preferred embodiment of the invention are illustrated in FIG. 4. The external surface 9 of the inner member is adapted to slideably engage with the inner surface 4 of the outer member 1. However, while being slideably engageable, it is preferred that a snug fit be achieved between the inner members and outer members when the fastening assembly is assembled and in use.

The external surface 9 of the inner member has a rib 10 that is complimentary in shape to the groove 5 on the internal surface of the outer member 1. The bottom portion 11 of the internal member 8 is flared or flanged to complement the internal 10 surface 6 of the outer member 1. The internal surface 12 of the inner member is threaded.

The internal members are adapted to abut together along edge surfaces 13, when slideably engaged with the outer member.

Figure 5:
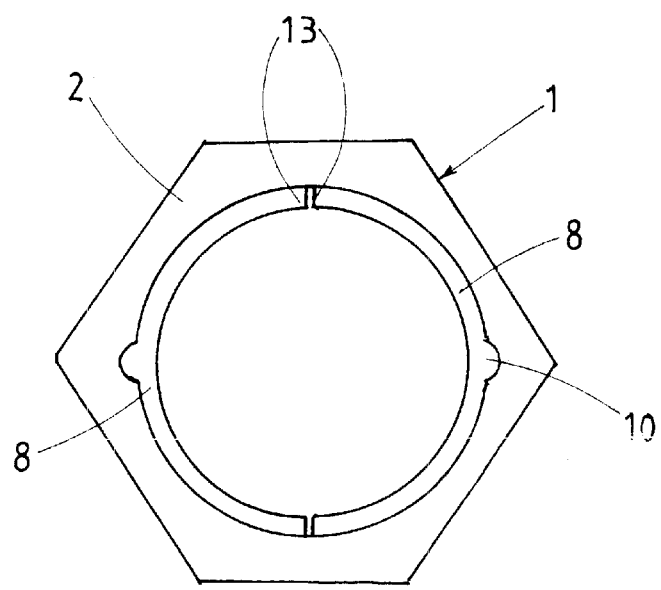
FIG. 5 shows a plan view of two inner member portions engaged with an outer member portion.

FIG. 5 illustrates a plan view of the inner members 8 slideably engaged with the outer member 1. Each edge 13 of each inner member is in an abutting relationship with the corresponding edge of the other inner member.

Figure 6:
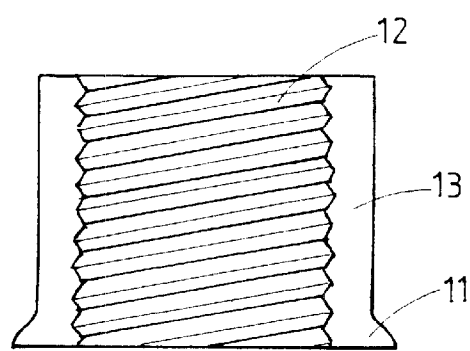
FIG. 6 shows a side view of an inner portion member.
Figure 7:
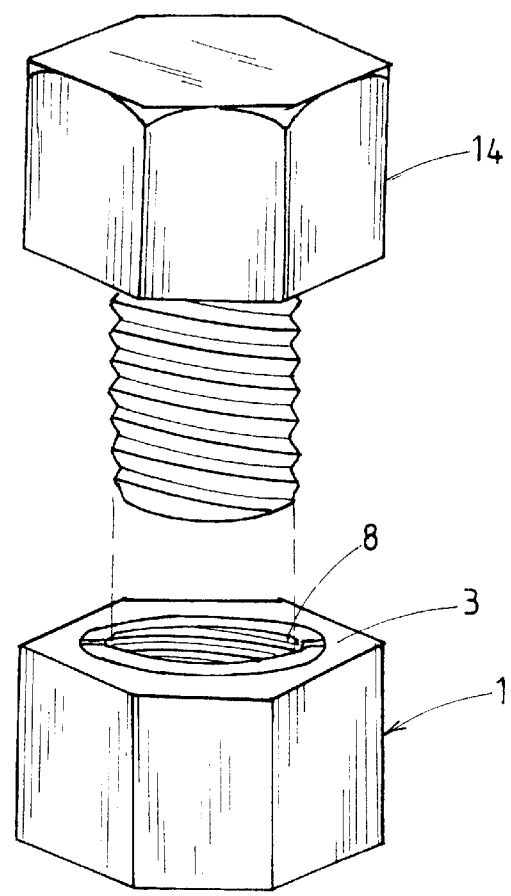
FIG. 7 is a perspective view of the fastening assembly and shows very schematically the outline of a threaded member in relation to a fastening assembly.

FIG. 6 show a side view of the inner member showing the threaded portion and also the edge abutment portions. The flared portion 11 at the bottom of the inner member is also illustrated, The relationship between the inner members and the outer member as illustrated in FIG. 2 shows the inner members extending outwardly from the bearing surface of the outer member by a fraction of a millimeter. It has been found that this in fact improves the properties of the bearing surface of the fastening assembly. The relationship between the inner members and the outer member is also illustrated in more detail in FIG. 7. The externally threaded member 14 is adapted to engage with the internally threaded inner members 8. FIG. 7 illustrates that the relationship between the threaded member 14 and the fastening assembly 1 is such that when the threaded member 14 is rotated relative to the fastening assembly 1, or when the fastening assembly is rotated relative to the threaded member, the complimentary internal thread of the fastening assembly engages with the external thread on the threaded member.

Figure 8:
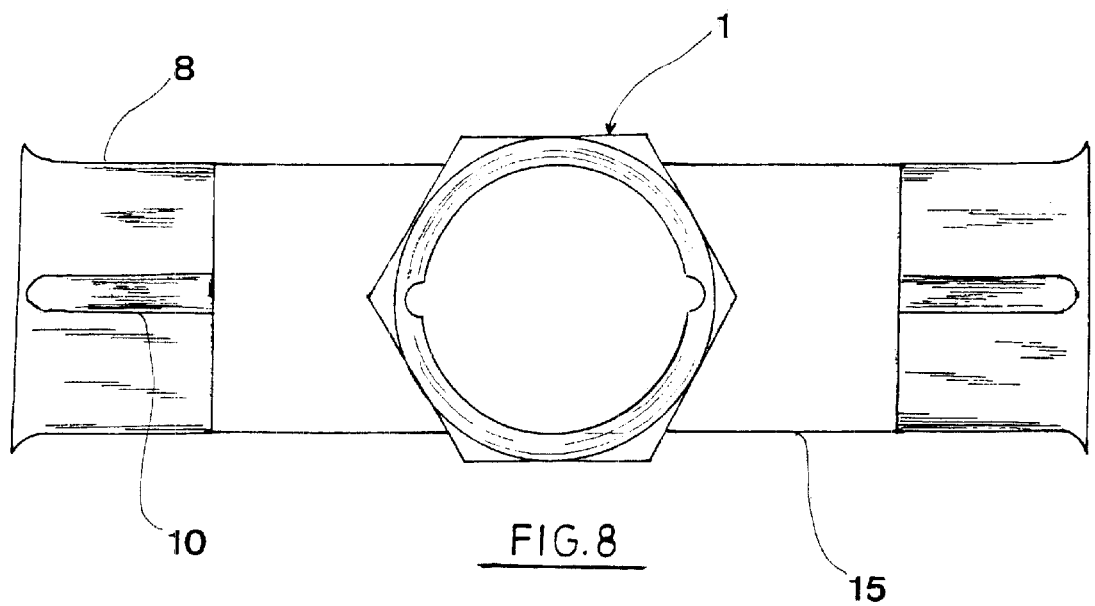
FIG. 8 is a plan view of the outer members and inner members connected together by sacrificial wires.
Figure 9:
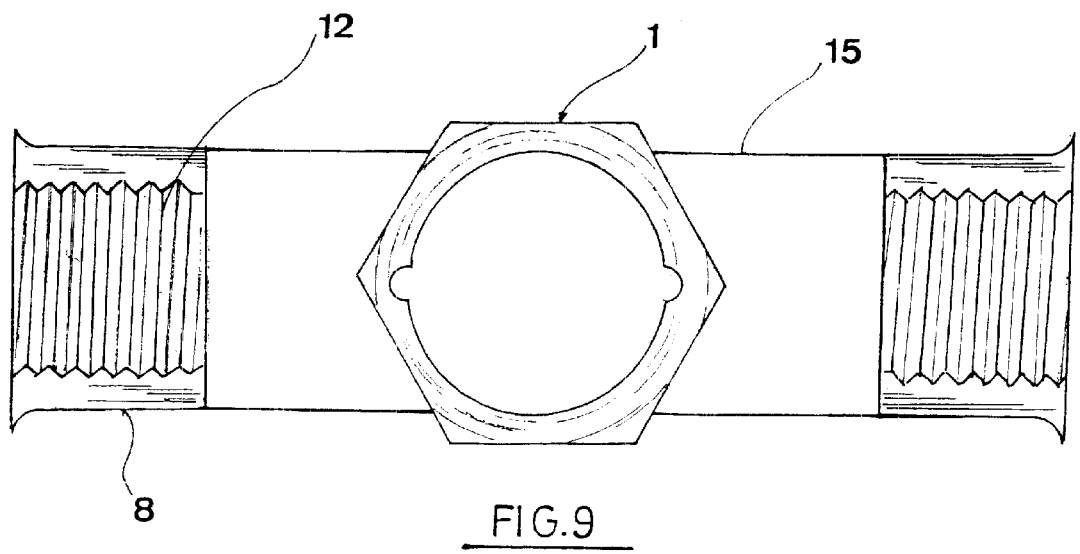
FIG. 9 is a bottom view of the arrangement of the outer member and inner members illustrated in FIG. 8.

In an optional embodiment it is envisaged that the provision of a retaining member would enable easy location of the inner members together with the outer member over a threaded shaft. It is also envisaged that the retaining member be a sacrificial wire or wires that connect the inner members to the outer member in a spaced apart arrangement such that the inner and outer members can be easily slid together in position over a threaded shaft could be provided. Such an embodiment is illustrated in FIGS. 8 and 9. The sacrificial wire 15 would preferably be dimensioned and adapted to break when the outer member was pushed over the inner members when positioned for engagement to a threaded shaft. It is further envisaged that such sacrificial wire or wires would be cast at the time the outer and inner members are cast.

In use, the fastening device assembly can be located over a threaded member and engaged with that threading member simply by turning the fastening assembly relative to the threaded member. The turning can be done with a conventional crescent or socket tool or simply by hand, depending on the particular application to which the fastening assembly is to be put. While the preferred embodiment illustrated shows a hexagonally shaped outer member, it is to be appreciated that in some applications an alternative shape or configuration of the outer member may be more appropriate. It is envisaged for example that a winged outer member, square shaped outer member or slotted outer member adapted to co-operate with split cotter pins would be beneficial in appropriate applications. It is also to be recognised that where a nut is employed in a situation where there is a need to maintain an aesthetic advantage, that specially shaped and moulded dress outer members could be made.

Preferably, the fastening assembly is made using a forging or casting method, although it is to be appreciated that other methods of manufacture could also be employed.

Alternatively, the inner members can be separated from the outer member and placed in location around the threaded member. The outer member can then be slideably engaged over the top of the inner members and the final tightening of the fastening assembly can be achieved using either conventional tools or by hand if required.

The fastening assembly enables easy removal of the inner and outer members of the assembly from the threaded member. The outer member of the fastening assembly can be removed simply by slideably disengaging the outer ring from the inner members with a tool such as a claw hammer, pliers, multi-grips or the like. Once the outer member has been released there is nothing holding the inner members together and these members will fall away from the threaded member. Alternatively, the fastening assembly can still be loosened conventionally by tools or manually if required.

There are a number of advantages that are achieved by the fastening assembly of the invention. These advantages include that the fastening assembly can be assembled or disassembled from a threaded member easily. Where one portion of the threaded member is cross threaded or damaged, the fastening assembly can be assembled remote from the damaged threaded portion and secured without having to try and rethread or force a conventional nut over the damaged threaded portion. The fastening assembly is suitable for multiple uses over a period of time.

Another advantage of the invention is that the fastening assembly is compatible with all conventional threading members such as bolts and the like and is not a task specific fastening member.

It is in envisaged that the fastening assembly will provide considerable timeliness advantages where temporary fencing, scaffolding or other readily assembled structures are required, simply because of the fast removal and application of the fastening assembly to a threaded member.

It is also envisaged that the fastening assembly could be modified to include a pressure or torque sensitive means or member between the inner and outer members of the fastening assembly. For example, a frangible rib or the like could be used that snaps off when the torque or pressure limit of the fastening assembly has been achieved. Such an indicator would provide the user with a guide to achieve the optimum strength from the assembly, It is to be appreciated that one could extend this fastening assembly for use in applications where the need for a threaded fastening connection is required. For example it has been recognised by the inventor that this fastening assembly could be modified for application as a conduit connector. When one end of the conduit is threaded and the fastening assembly is adapted to engage with the threaded end of the conduit a conduit coupling means such as a hose clip or the like would be provided.

Wherein the foregoing description reference has been made to integers or components having known equivalents thereof, those integers are herein incorporated as individually set forth.

While the invention has been described with reference to specific examples and embodiments thereof, it is to be appreciated that modifications may be made to the embodiments without departing from the spirit or scope of the invention.

What I claim is:

1. A threaded fastening device assembly including, an outer member having an upwardly extending and circumferentially disposed body with a non-threaded inner and outer surface, at least two inner members, each inner member having an internal surface which is threaded and an outer surface that is complimentary in shape to said inner surface of said outer member, wherein, said outer member is adapted to be slideably engageable with said inner members and wherein in use, said fastening assembly is rotatable and engageable with a complimentary threaded fastening shaft;

wherein the body of said outer member is adapted and dimensioned in shape to include a recess extending circumferentially around the base of said body, which is adapted to receive a complimentary flange extending from each of said inner members.

2. The fastening assembly according to claim 1 wherein each inner member further includes a locking means which is adapted to engage with a complimentary locking means on said outer member.

3. The fastening assembly according to claim 2 wherein the locking means on the inner member is at least one rib which engages with at least one corresponding groove on said outer member.

4. The fastening assembly according to claim 1 wherein the external surface of the outer member is hexagonally shaped.

5. A kit of parts for a threaded fastening device assembly as defined in claim 1, wherein said kit includes an outer member and at least two inner members according to claim 1.

6. The kit of parts according to claim 5 which further includes a retaining member to retain each of the inner members in fixed location to each other.

7. The kit of parts according to claim 6 wherein the retaining member retains said inner members in a spaced apart relationship, such that in use, said retaining member and inner members can be slid down the length of a threaded shaft and positioned to receive and engage with said outer member.

8. The kit of parts according to claim 6 wherein the retaining member is at least one sacrificial wire.

9. An outer member adapted to receive two or more inner member portions as defined in claim 1.

10. An inner member portion as defined in claim 1, wherein two or more inner member portions together are adapted to be slideably engageable with an outer member.

* * * * *